US008640991B2

(12) United States Patent
Saalmann

(10) Patent No.: US 8,640,991 B2

(45) Date of Patent: Feb. 4, 2014

(54) WINDOW FOR AIRCRAFT WITH MICROSTRUCTURE AS A SUNSCREEN

(75) Inventor: Michael Saalmann, Vreden (DE)

(73) Assignee: Airbus Operations GmbH (DE)

( * ) Notice: Subject to any disclaimer, the term of this patent is extended or adjusted under 35 U.S.C. 154(b) by 625 days.

(21) Appl. No.: 12/157,939

(22) Filed: Jun. 13, 2008

(65) Prior Publication Data

US 2009/0321571 A1 Dec. 31, 2009

Related U.S. Application Data

(60) Provisional application No. 60/934,856, filed on Jun. 15, 2007.

(30) Foreign Application Priority Data

Jun. 15, 2007 (DE) ........................ 10 2007 027 735

(51) Int. Cl.
*B64C 1/14* (2006.01)

(52) U.S. Cl.
USPC ........................................ 244/129.3; 359/591

(58) Field of Classification Search
USPC ........................ 244/129.3, 121; 359/591–598
See application file for complete search history.

(56) References Cited

U.S. PATENT DOCUMENTS 2,708,136 A * 5/1955 Norris ............................ 296/64
3,906,669 A * 9/1975 Vorguitch ....................... 49/372
6,056,239 A * 5/2000 Cantu et al. ................ 244/118.6
6,467,935 B1 * 10/2002 Schwab ........................ 362/354
2005/0254130 A1 * 11/2005 Graf et al. ..................... 359/604

FOREIGN PATENT DOCUMENTS

DE 3940146 A1 6/1991
DE 19824215 A1 12/1999
DE 10161938 A1 6/2003
DE 60215227 T2 10/2007

* cited by examiner

*Primary Examiner* — Timothy D Collins
*Assistant Examiner* — Brian M O'Hara
(74) *Attorney, Agent, or Firm* — Lerner, David, Littenberg, Krumholz & Mentlik, LLP

(57) ABSTRACT

An aircraft window includes a microstructure so that light rays with a correspondingly large angle of incidence are reflected back to the exterior region. By contrast, light rays with another, i.e. smaller, angle of incidence are allowed to pass almost without hindrance. The microstructures are designed as optical prisms, wherein the order of magnitude of the prisms is in the region of light wave lengths.

5 Claims, 3 Drawing Sheets

35

34

WINDOW FOR AIRCRAFT WITH MICROSTRUCTURE AS A SUNSCREEN

CROSS-REFERENCE TO RELATED APPLICATIONS

This application claims the benefit of the filing date of U.S. Provisional Patent Application No. 60/934,856 filed Jun. 15, 2007, the disclosure of which is hereby incorporated herein by reference.

BACKGROUND OF THE INVENTION

The present invention relates to an aircraft window with a device providing protection against light rays.

Except for a UV filter, aircraft windows presently may not provide any protection against the sun. At best, separate mechanical screens are arranged in front of aircraft windows as a sunscreen, which screens can be manually operated. These screens are also used as electromechanically operated curtains. However, cabin windows comprising electrochromic layers as a sunscreen may not provide total protection against the sun because of their residual transmission which is too high.

SUMMARY OF THE INVENTION

According to an exemplary embodiment of the present invention an aircraft window is provided, wherein the aircraft window comprises a protection device providing protection against light rays, which device is designed such that the protection depends on the angle of incidence of the light rays impinging on the aircraft window.

This may provide for an improved protection against the sun.

A further exemplary embodiment provides an aircraft window that comprises an optical prism structure. In this design optical prisms are arranged on the plane-parallel base area of the aircraft window, in particular on the outside of the aircraft window.

According to a further exemplary embodiment of the present invention, the optical prism structure is designed as a microstructure. In this arrangement the order of magnitude, i.e. the size of the individual prisms of the microstructure is in the region of light wave lengths. The microstructures are therefore visually not perceptible and a passenger's view through the aircraft window may thus not be significantly impaired. The microstructures are in particular arranged on the exterior region of the aircraft window, which exterior region faces away from the interior of the cabin. Due to the order of magnitude of the microstructures, dirt build-up and aerodynamic influences are practically impossible.

In a further exemplary embodiment of the present invention, the aircraft window comprises a switchable glazing arrangement. This can, in particular, be an electrochromic layer by means of which light transmission can be controlled.

In a further exemplary embodiment of the present invention, an aircraft comprising an aircraft window according to the invention is provided.

BRIEF DESCRIPTION OF THE DRAWINGS

Below, for further explanation and to provide a better understanding of the present invention, exemplary embodiments are described in more detail with reference to the enclosed drawings. The following are shown.

DETAILED DESCRIPTION

Figures 1, 2, 3, 4:
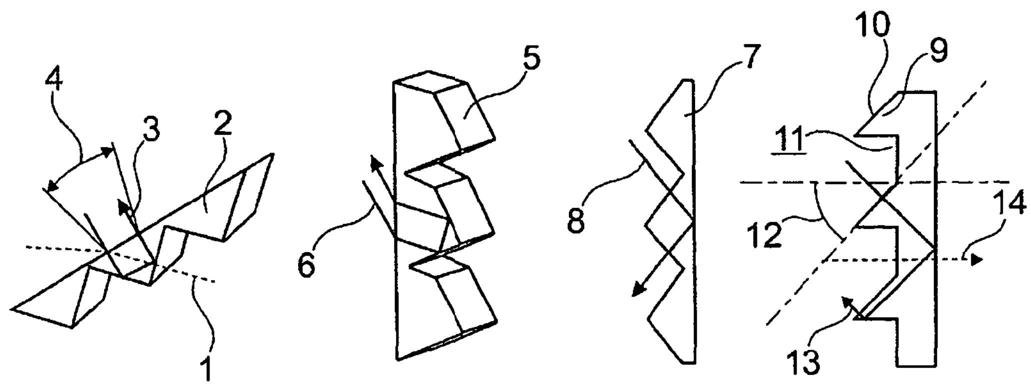
FIG. 1 a 90° retro-prism.
FIG. 2 a tilted 90° prism.
FIG. 3 a system providing total reflection.
FIG. 4 a system providing two total reflections as well as self-shading.

FIG. 1 shows a microstructure 2 that is designed as a 90° retro-prism. As shown in FIG. 1, while a light ray 1 is deflected, it can nevertheless pass through the microstructure 2, thus reaching the cabin interior of an aircraft. In contrast to the above, the light ray 3 is doubly reflected back to the exterior region. Due to the microstructure 2 a block out region 4 results, wherein the rays within this block out region 4 cannot pass through the aircraft window.

FIG. 2 shows a further microstructure 5, namely a tilted prism 90°. A light ray 6 is shown which due to the microstructure 5 is reflected back to the exterior region.

FIG. 3 shows a system providing total reflection, wherein a microstructure 7 is disclosed that in cross section is designed as a row of adjoining isosceles triangles. As shown in FIG. 3, a light ray 8 is reflected at a corresponding angle of incidence.

FIG. 4 shows a system providing double total reflection as well as self-shading. A light ray 14 is shown which impinges upon the microstructure 9 approximately perpendicularly and passes the microstructure 9 almost without hindrance. In contrast to the above, a light ray 13 with a correspondingly inclined angle of incidence is reflected back to the exterior region. The surface of the aircraft window according to FIG. 4 is characterised by the constant change between a plane-parallel base area 11 of the aircraft window and a prismatic effective area 10. The angle 12 between the prismatic effective area 10 and the plane-parallel base area or face 11 is characteristic, wherein in this case said angle 12 is approximately 42° or in the region of the critical angle of total reflection at the boundary layer of polycarbonate or PMMA (acrylic glass or plexiglass) to air.

Figure 5:
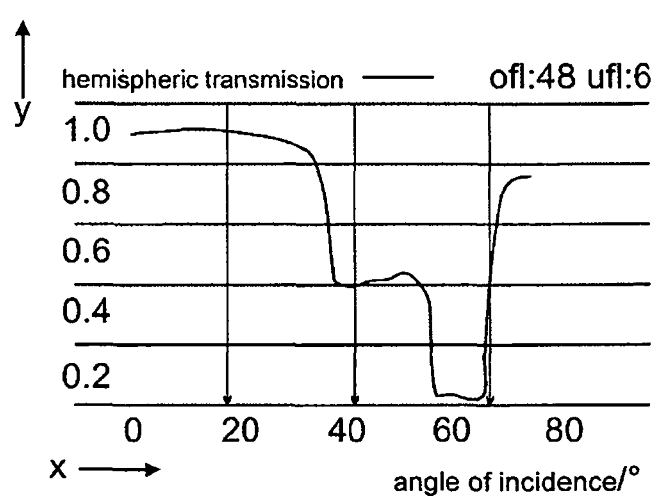
FIG. 5 transmission of light rays depending on the angle of incidence.

FIG. 5 shows the transmission of light through the microstructure 9 according to FIG. 4 depending on the angle of incidence. The y-axis shows the component of the incident light ray that passes through the microstructure 9. The x-axis shows the angle of incidence. The angle of incidence results as the deviation from perpendicular onto the base area 11. In FIG. 4 the light ray 14 thus has an angle of incidence of approximately 0°, while the light ray 13 has an angle of incidence of approximately 45°.

Figure 6:
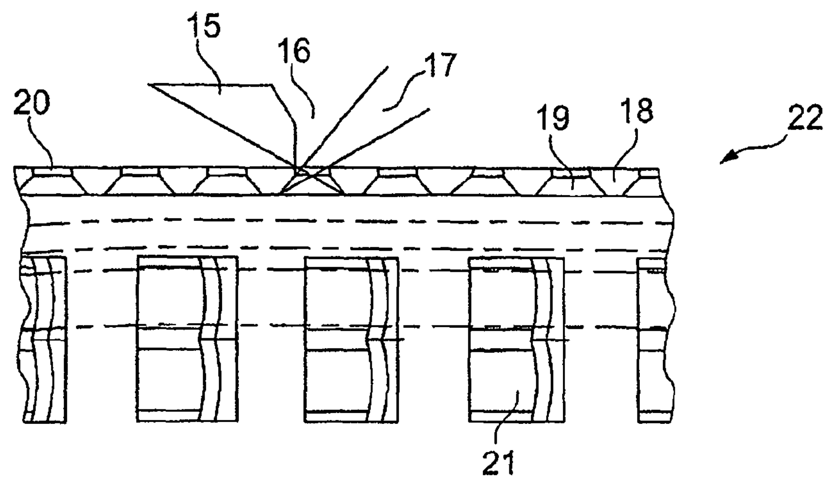
FIG. 6 a diagrammatic cross section of part of an aircraft.

FIG. 6 shows a diagrammatic cross section of an aircraft 22, wherein several seat rows 21 are shown. In this arrangement the aircraft windows 19 are framed by frame elements 18 and comprise microstructures 20. These microstructures 20 may result in light rays within a region 16 being able to enter the aircraft almost without hindrance. Light rays within the region 15 are almost completely blocked out. Due to the microstructure 20, light rays within the region 17 are only partially blocked out.

Figure 7:
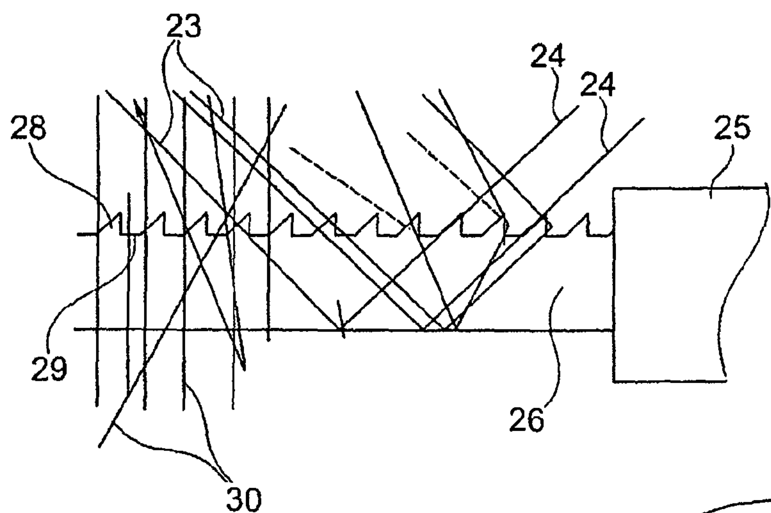
FIG. 7 a section of part of the cross section of the aircraft.
Figure 7:
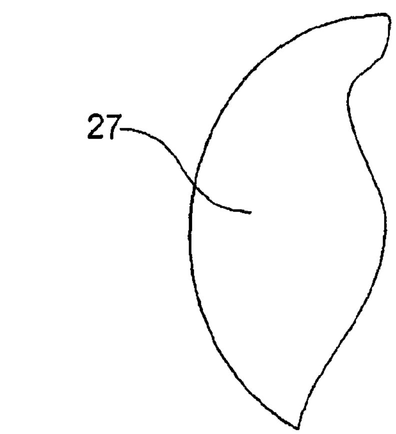

FIG. 7 shows an aircraft window 26 comprising a microstructure 28. The aircraft window 26 is arranged between frames 25. Passengers can adjust their seats, for example in order to sleep during an extended flight. In this case the passenger's head 27 is offset to the right-hand side (as shown in FIG. 7) when compared to the usual position. Therefore, essentially only light rays 23 with a corresponding angle of incidence can reach the passenger. However, this is based on the assumption that passengers whose seats are reclined do not wish to have any solar radiation because they wish to rest or sleep. The microstructure 28 that is arranged on the outer rim of the aircraft window 26 then results in the light rays 23 with their relatively large angle of incidence being unable to pass through the aircraft window 26. These light rays 23 are reflected back to the exterior region as light rays 24. In contrast to this, light rays 30 with a relatively small angle of incidence (i.e. the incident light rays 30 form an angle of approximately 90° to the plane-parallel base area 29 of the aircraft window) are not reflected back and can pass through the aircraft window 26 almost without hindrance. This hardly impedes a passenger's view perpendicularly through the window 26.

Figure 8:
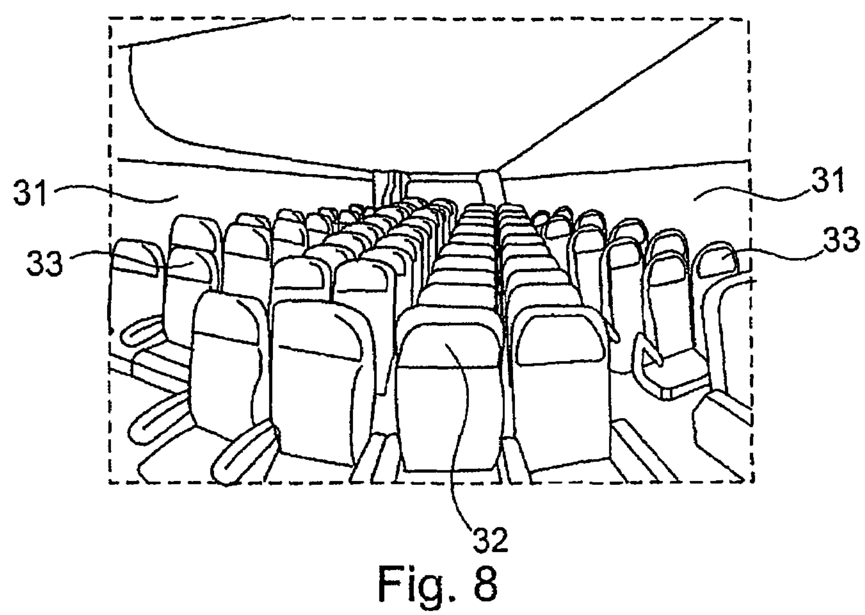
FIG. 8 an image made by a cabin recording device.

FIG. 8 shows an image made by a cabin recording device. The image shows seat rows 32 and 33, wherein the image of the seat rows 32 is exposed normally. In contrast to the above, the image of the seat rows 33 that are arranged near the aircraft windows 31 are overexposed. An aircraft window according to the invention would, in particular, filter out the oblique incident light rays that result in overexposure of the seat rows 33. For this reason, if aircraft windows according to the invention are used, there may no longer be any overexposure.

Figure 9:
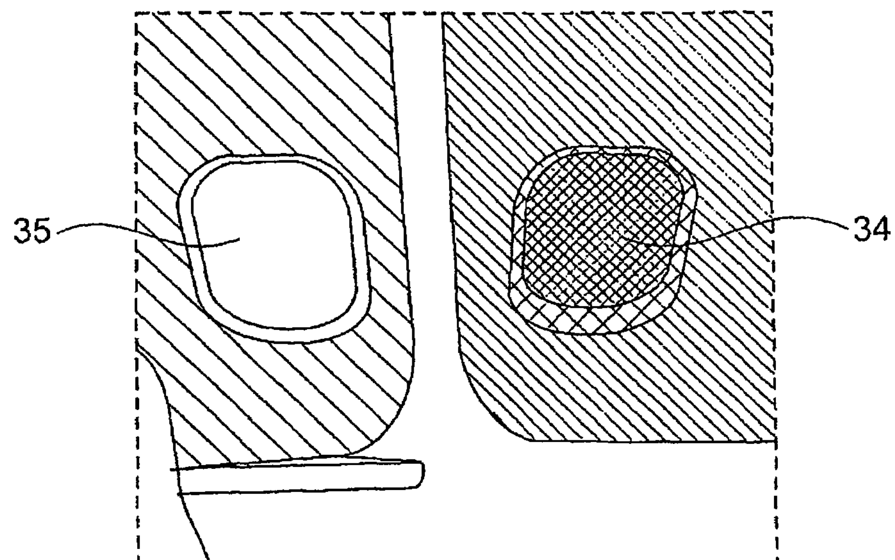
FIG. 9 an illustration of aircraft windows with an electrochromic cabin glazing arrangement.

FIG. 9 shows an image of two aircraft windows 34 and 35 with electrochromic cabin glazing. In the case of the aircraft window 34 the sunscreen is switched on, while in the case of the aircraft window 35 the sunscreen is switched off. Despite the sunscreen, the aircraft window 34 is associated with undesirable residual transmission of light. In combination with the sunscreen according to the invention, such residual transmission may be significantly reduced.

With reference to FIG. 7, an aircraft window 26 is disclosed that comprises a microstructure 28 so that light rays 23 with a correspondingly large angle of incidence are reflected back to the exterior region 24. In contrast to this, light rays 30 with another, i.e. smaller, angle of incidence are allowed to pass almost without hindrance. The microstructures 28 are designed as optical prisms, wherein the size of the prisms is in the region of light wave lengths.

Implementation of the invention is not limited to the exemplary embodiments shown in the figures. Instead, a multitude of variants are possible that take advantage of the solution provided and of the principle according to the invention, even if the embodiments differ in principle.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Incident light ray
2 Microstructure
3 Reflected light ray
4 Block out region
5 Microstructure
6 Reflected light ray

7 Microstructure
8 Reflected light ray
9 Microstructure
10 Effective area of the prism
11 Base area of the aircraft window
12 Angle of the effective area
13 Reflected light ray
14 Incident light ray
15 Region in which light rays are blocked
16 Region in which light rays pass through aircraft windows
17 Region in which light rays are partially blocked
18 Frame
19 Aircraft window
20 Microstructure
21 Seats
22 Aircraft cross section
23 Incident light rays
24 Reflected light rays
25 Frame
26 Aircraft window
27 Passenger's head
28 Microstructure
29 Base area of the aircraft window
30 Incident light rays
31 Aircraft window
32 Seats of the interior region
33 Seats of the aircraft window region
34 Aircraft window with sunscreen switched on
35 Aircraft window with sunscreen switched off

The invention claimed is:

1. An aircraft comprising:

an aircraft window having a substantially uniform thickness;

a passenger seat; and a passenger volume associated with the passenger seat, wherein the passenger volume is the volume normally occupied by a passenger sitting on the passenger seat;

wherein the passenger volume comprises first and second head regions, the first head region being generally perpendicular to a first section of the window and occupied by a passenger's head when the passenger seat is in an upright position and the second head region being spaced apart from the first head region in a direction generally parallel to a longitudinal axis of the aircraft and occupied by a passenger's head when the passenger seat is in a reclined position;

wherein the aircraft window comprises a protection device immovable relative to the remainder of the window and providing protection against light rays, said device being configured such that the protection depends on the angle of incidence of the light rays impinging on the aircraft window and the positions of the first and second head regions relative to the window, wherein the protection device comprises an optical prism structure arranged on a plane-parallel base area of the window, wherein the protection device prevents substantially all first incident light rays having one or more first predetermined angles of incidence from reaching the second head region by reflecting the first incident light rays to the exterior of the aircraft; and wherein the protection device allows second incident light rays having one or more second predetermined angles of incidence to reach the first head region.

2. The aircraft of claim 1, wherein the optical prism structure is arranged on the outermost side of the aircraft window, the protection device thereby exposed to the ambient environment outside the aircraft.

3. The aircraft of claim 1, wherein the optical prism structure is configured as a microstructure.

4. The aircraft of claim 1, wherein the aircraft window comprises a switchable glazing arrangement.

5. The aircraft of claim 4, wherein the switchable glazing arrangement is configured as an electro-chromic layer.

* * * * *